Jan. 27, 1942.   T. J. ROBINSON   2,270,969
FILTER DEVICE
Filed Jan. 16, 1939
Fig. 1
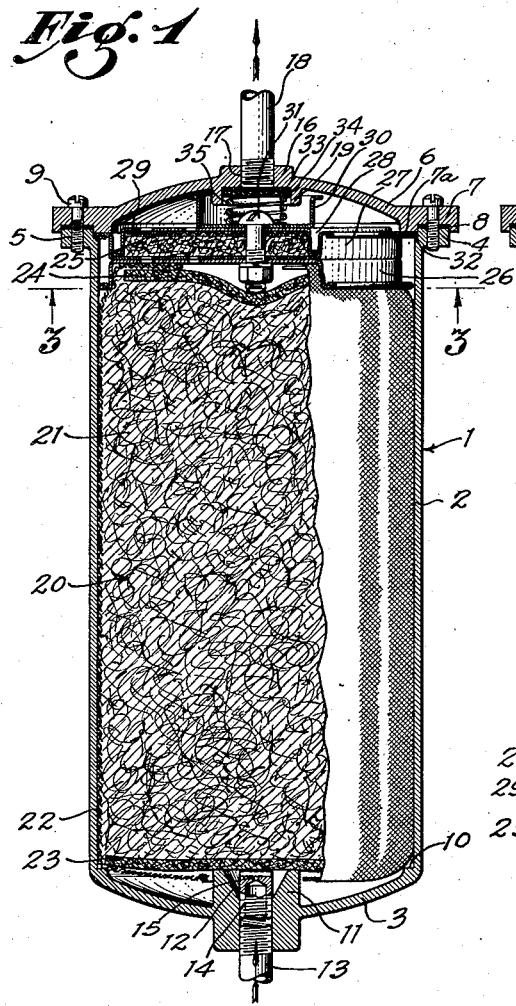
Fig. 2
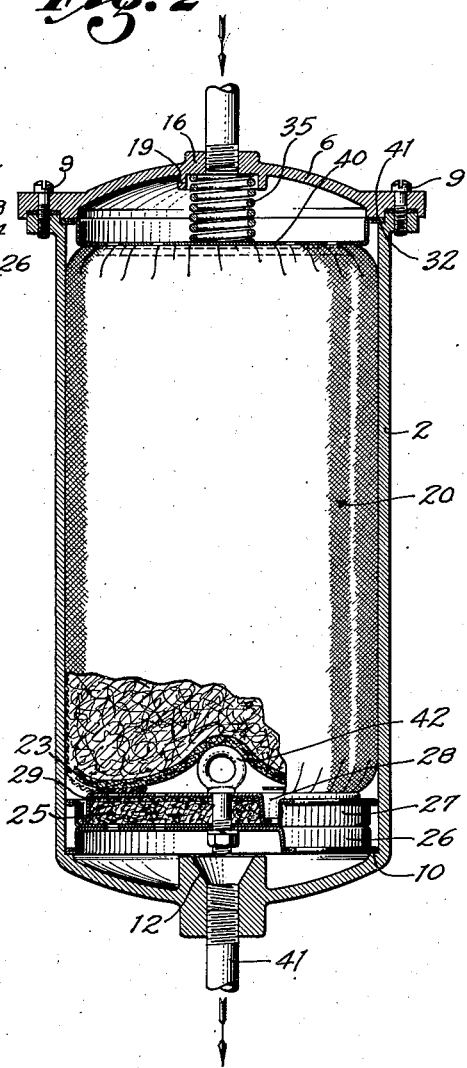
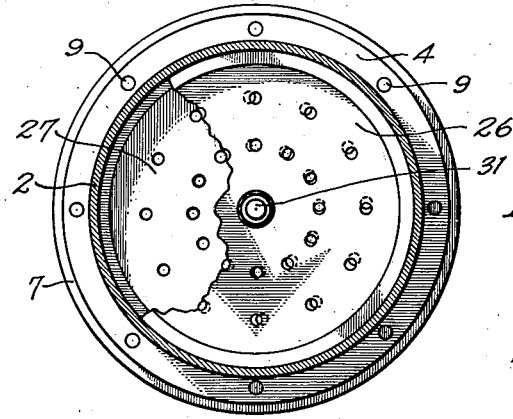
Fig. 3
THOMAS J. ROBINSON,
INVENTOR.
BY Calvin Brown,
ATTORNEY.

Patented Jan. 27, 1942

2,270,969

UNITED STATES PATENT OFFICE 2,270,969

FILTER DEVICE

Thomas J. Robinson, Los Angeles, Calif.

Application January 16, 1939, Serial No. 251,157

5 Claims. (Cl. 210—131)

This invention relates to a filter device, and has among its objects the provision of a device having few parts, inexpensive in cost of manufacture, which will operate over a long period of time without attention, wherein the filtering material may be readily changed with minimum of expense, is adaptable for many uses wherever it is necessary to either clean oil or in certain embodiments remove oil from an air line.

The filter device to be described includes a casing of any conventional form and within the casing may be placed waste material, such as cotton waste, cellulose fibre, or that type of waste which is supplied machine shops and the like, for the cleaning of various tools. This waste may be in free form, or in an embodiment of the invention, may be enclosed within a suitable bag. This constitutes the filtering material. In addition thereto and situated above and below the waste material and within the bag are additional filtering members formed of felt. I have found that the felt, together with the waste material accomplishes remarkable results in the filtration of oil. In addition to the filtering material mentioned, I also provide a means whereby the rate of movement of liquid through the filtering material is conveniently regulated to secure the best results for the particular gravity of oil to be filtered.

An object of the present invention is the provision of a filter device which is capable of working satisfactorily with oils varying from 10 to 50 gravity.

Another object is the provision of a filter device adapted to properly filter oil or other material under either high or low pressure conditions.

The present invention is adaptable to the cleaning of oil of any character and to this end the said filter device has its parts and members so arranged that if the user of said device is unable to obtain a new filter cartridge, still the user may substitute for the cartridge, ordinary cotton waste and thereafter have a device which will filter oil efficiently.

With respect to the foregoing object, it is customary to have around repair shops or carried in the automobile, bundles of cotton waste and this same waste may be used as the primary filtering material for the oil. Thus, the filter device is an economical one, in that it does not require for its efficiency factory made filter cartridges, nor specially prepared material for the purpose of cleaning oil.

Another object is the provision of a filter device so arranged and constructed that the same is adaptable for high or low pressures. In one embodiment of the invention, the arrangement is such that oil pressures from 15 to 75 pounds per square inch may be readily handled and in the second embodiment, oil pressures of 5 to 15 pounds per square inch may be handled.

Another object is the provision of a filter device wherein lint and the like is effectively prevented from in any manner clogging a line through which liquid, such as oil, is passing.

The invention has among its further objects the provision of a filter device which is simple of construction, fool proof in operation, of long life, efficient, durable, of few parts, with practically nothing to get out of order, with the filters readily replaceable, and which is generally superior to devices now on the market adapted to clean oil.

With the above and other objects in view, the invention consists in the novel and useful provision, formation, construction, association, and relative arrangement of parts, members and features, all as shown in certain embodiments in the accompanying drawing, described generally, and more particularly pointed out in the claims.

In the drawing:

Figure 1 is a fragmentary view in vertical section of the high pressure filter device, Figure 2 is a fragmentary vertical sectional view of the low pressure filter device, and, Figure 3 is a fragmentary view and in section taken on the line 3—3 of Figure 1.

Referring now with particularity to the drawing, the filter device shown in Figure 1 is denoted as an entirety by 1, wherein 2 is a casing which may be cylindrical in form and provided with a base member 3. This casing is open at the top and provided with a rim flange 4, the rim flange in turn formed with threaded openings 5, of which there may be a space plurality. A cover or cap 6 acts as a closure for the open end of the casing 2. This cover is of the convex-concavo type merging into a ring 7, the under surface of which is provided with an annular groove 8 to the end that a portion of the ring flange 4 may be accommodated therein. This ring is provided with a plurality of openings adapted to align with the tapped openings 5, and whereby screws 9 may be passed through the openings of the ring and threaded in the openings 5. As is usual practice, a gasket is provided between flange 4 and in groove 8.

While the base 3 is integral with the casing, still this base may be detachable, if desired. The base on its inner surface is provided with an annular shoulder at 10. This shoulder is provided for the purpose of allowing certain elements of the invention to either lie adjacent the cover or cap or to rest upon the shoulder 10, as see Figure 2. Centrally of the base and axially of the casing, the base is provided with an internal and an external stud 11. This stud is provided with a central threaded opening and that portion of the stud which is within the confines of the casing is provided with an inverted conical or tapered wall 12. This stud is adapted to have connection with the oil line 13 leading from the oil pump of say, a motor. An orifice member 14 is threaded within the stud and it will be noted that this member has a small opening at 15. Thus, oil from the sump must pass through the orifice member in that form of the invention depicted in Figure 1.

The cover 6 is provided with a central enlargement 16 which is provided with a tapped bore 17 to receive an oil line 18 leading to the oil sump in that embodiment of the invention where the present filter device is used in conjunction with a motor. Generally in place of providing the oil lines, such as shown at 13 and 18, in direct threaded connection with the cover and base, fittings are utilized. This simplifies the procedure, as oil lines are usually of soft copper tubing and threading of the same is impractical. An annular depending flange 19 is positioned within the cover.

In the embodiment of the invention, I provide for placement within the casing a primary filter 20 consisting of a cartridge of waste 21, such as cellulose fibre, enclosed within a cloth bag 22. At ends of the waste are placed felt discs 23 and 24, the cloth bag or envelope being so formed as to annularly overlie the end discs. In constructions of this type, the envelopes may be made substantially cylindrical in form and provided with draw ends. Hence, it is a simple matter to insert a felt disc, tighten the draw string thereover and fill the envelope with the cellulose fibre, and thereafter place over the fibre a felt disc and tighten the draw string. This construction allows the inner end of the stud 11 to abut against the felt disc 23.

The secondary filter is shown at 25. This secondary filter is formed of wool. This secondary filter is adapted to act in conjunction with means for regulating the rate of flow of oil through the primary filter from the intake end to the outlet. This means includes members 26, 27 and 28. The members 26 and 27 comprise two perforated discs provided with rim flanges. It will be seen that the rim flange of the member 26 is adapted to receive the upper end of the primary filter cartridge. The member 28 includes a perforated disc provided with a rim flange; this flange fits within the confines of the rim flange of the member 27. Adapted to be interposed between the disc of the member 27 and a fine wire screen 29 is the secondary filter 25. The fine wire screen lies adjacent the perforated disc or member 28.

Carried on the outer surface of the disc or member 28 is a member 30. This member is a small cup or disc formed with a rim flange. The discs of all the members 26 to 30, inclusive, are provided with an axial bore whereby the members may be held in position of assemblage through the medium of a bolt and securing nut designated generally as 31. Thus, the members 26 and 27 may be relatively rotated to either cause alignment of the perforations in the discs or partially open the perforations therethrough, as is self-evident. In the construction shown, the rim flange 4 is annularly shouldered at 32 and it is to be observed that the flange of member 27 rests upon this shoulder. The forming of the groove 8 in ring 7 of the cover 6 provides a flange 7ª, which when the flange of member 27 rests on the shoulder 32, engages the top surface of said flange or member 27 and holds the member against movement.

Received within the confines of the annular flange 19 is a wire screen 33 and a felt pad 34, and adapted to bear against the inner surface of the disc or member 30 and the surface of the felt 34 is a coil spring 35.

The operation, uses and advantages of that form of the invention just described is as follows: If we assume that oil is entering the device through pipe 13, the same will pass through the orifice and the orifice will be maintained clean due to the fact that any lint or other material that might otherwise tend to clog the orifice may be received within the conical concavity 12 of the stud 11. The path of oil movement is as follows: Through the felt disc 23, the primary filter 20, the felt disc 24, the openings in members 26 and 27, the secondary felt filter, screen 29, the openings in disc 28 into the space included by the concavity of the top, and the disc 28. The oil will then pass between the flange of member 30 and the concaved surface of the top through the space included between the coils of the spring and upwardly through the felt disc 34 and screen 33 into line 18.

Obviously, the non-concentric position of the perforations of the members 26 and 27, as illustrated in Figure 3, will control the velocity of oil through the device. The tortuous path that the oil must use after passing through the secondary filter acts to assure that all waste materials, and the like, not otherwise trapped by the felt filters shall be removed from the oil, and to this end the spring acts as a trap for any such material. In fact, the coils of the spring with the slight spacing allowed therebetween, functions as an orifice of the spiral helix type.

If we assume that it becomes necessary to renew the cartridge, that is to say, the primary filter, it is a simple matter to remove the screws 9, remove the cap, the assembled members 26, 27, 28 and 30 will lift out, whereupon the cartridge may be secured in any manner and pulled from the casing. If a new cartridge enclosed within a fabric envelope is not obtainable, then cellulose fibre, or similar material may be packed within the casing. It is preferable to save the felt discs 23 and 24, and to place one in the bottom of the casing prior to filling the same with the waste material, and then to place the felt disc 24 over the waste material, whereupon the assembled members 26, 27 and 30 may again be placed in position and the cap secured to the casing. It is hardly ever necessary to renew the secondary filter and if it is necessary, this is easily accomplished by removing the bolt 31, thus permitting disassemblage of the several members before mentioned. However, the secondary filter and its screen may be easily cleaned by placing the same in gasoline.

The inventor has found that the combination of felt plus cellulose fibre cleans oil of all deleterious matter to a surprising degree. The inventor does not use synthetic felt as such, but wool which has been "felted." Better results are accomplished with the use of the felt discs than are accomplished with the device when they are not used. Corrosive elements which may sometimes be present in oil are apparently removed from the oil in the passage through the felt and cotton combination of filters.

In that form of the invention shown in Figure 2, I have provided in a number of instances members of the type used in Figure 1, and wherever possible, like numerals will designate like elements. In the form of the invention in Figure 2, I provide what is known as a down-flow filter. The casing is the same as before as is also the cartridge and the arrangement of the members 26, 27 and 28, the only difference residing in the provision of an I-bolt in place of that form of bolt shown at 31, and the elimination of the member 30. I also provide a further perforated disc 40 having a rim flange 41 adapted to rest upon the shoulder 32. The coil spring 35 is provided as before, save and except that it may be of greater length than in the showing of Figure 1. The orifice member 14 is removed.

The operation is as follows: Oil under low presure, to-wit: 5 to 15 pounds per square inch, enters through the cover, passes between the openings of the spring, thence through the perforations of the disc 40, the primary filter, the perforations of the member 28, the screen therein, the secondary filter, the perforations of the members 26 and 27 and outwardly through the outlet pipe here designated as 41. If it is desired to remove the primary filter, the cover may be detached from the casing, and the filter then removed in any ordinary manner. If it is desired to remove the secondary filter assembly, a hook may be inserted within the casing for engagement with the eye 42, whereupon such removal may be accomplished.

It is obvious from the description as given that I have provided a form of filter device which is adaptable to various uses and purposes, and to lines which operate under either high or low pressure. All the parts are easily assembled or disassembled. It does not require a skilled mechanic to replace the primary filter, nor a skilled mechanic to clean any part of the device considered as an entirety.

I have found that filters of the character shown are of great use in dental offices where air under pressure is used for drying cavities in teeth. Often a dentist during the drilling of a tooth will have the assistant blow air both upon the drill and into the cavity for the purpose of removing the drillings. This air from a compressor usually contains fine vaporized oil and if oil is present in appreciable quantities, the fillings placed in the cavities of the teeth will not always remain in the cavities. A filter of the low pressure or high pressure type may be utilized in the air line for the purpose of removing oil, dirt and condensation products, thus delivering clean air.

I claim:

1. A filter cartridge comprising a fabric envelope, felted wool discs within said envelope, and fibrous cellulose interposed between said discs and within the envelope.

2. In a device of the character disclosed, a casing adapted to house: a primary filter, and a secondary filter in contiguous relationship, and means interposed between both said filters for regulating the rate of flow of a liquid to be passed through the primary filter to the secondary filter.

3. In a device of the character disclosed, a casing adapted to house: a primary filter, and a secondary filter in contiguous relationship, means interposed between said filters for regulating the speed of flow of any liquid to be passed from the primary filter to the secondary filter, and means for removing any foreign material from said secondary liquid after passing through said filter.

4. In a device of the character disclosed, a primary filter, and a secondary filter in contiguous relationship, means interposed between said filters for regulating the speed of flow of any liquid to be passed from the primary filter to the secondary filter, and means for removing any foreign material from said liquid after passing through said secondary filter, said means comprising a closely coiled spring through which said liquid must pass in its flow movement.

5. In a device of the character disclosed, a filter assembly comprising three perforated discs all provided with rim flanges, two of said discs being in juxta-position and the other of said discs having the flange thereof resting on a surface of one of the discs, a filter interposed between the last two discs, and means for holding said discs and filter in position of assemblage; and the two discs in juxta-position being relatively turnable to bring the perforations thereof into registry or out of registry.

THOMAS J. ROBINSON.